US005207285A

United States Patent [19]
Josefsson

[11] Patent Number: 5,207,285
[45] Date of Patent: May 4, 1993

[54] METHOD OF AND APPARATUS FOR CONTROLLING THE FLOW RATE OF OUTSTREAMING LIQUID METAL FROM AN INDUCTIVELY HEATED LADLE

[75] Inventor: Kenneth Josefsson, Sandviken, Sweden

[73] Assignee: Sandvik AB, Sandviken, Sweden

[21] Appl. No.: 709,291

[22] Filed: Jun. 3, 1991

[30] Foreign Application Priority Data

Jun. 1, 1990 [SE] Sweden .................................. 9001983

[51] Int. Cl.$^5$ .......................................... G01G 19/00
[52] U.S. Cl. ...................................... 177/245; 177/60; 177/165; 177/199; 177/210 EM; 177/1
[58] Field of Search ................. 177/245, 165, 60, 253, 177/1, 199, 210 EM; 164/457, 150; 222/593, 594

[56] References Cited

U.S. PATENT DOCUMENTS

| | | | |
|---|---|---|---|
| 3,842,893 | 10/1974 | Booth | 164/457 |
| 3,890,833 | 6/1975 | Peer | 177/210 EM X |
| 4,084,631 | 4/1978 | Kunzmann | 164/457 |
| 4,986,517 | 1/1991 | Ford et al. | 222/593 X |
| 5,054,664 | 10/1991 | Brückner | 222/593 X |
| 5,123,631 | 6/1992 | Matsuoka et al. | 222/593 X |

Primary Examiner—Benjamin R. Fuller
Assistant Examiner—Randy W. Gibson
Attorney, Agent, or Firm—Burns, Doane, Swecker & Mathis

[57] ABSTRACT

A method and an apparatus for accurately weighing by a ladle weighing unit (2) of a metal melt in a ladle (3), in which the melt can be heated and stirred by power supplied by an induction coil (4). The induction field of the coil (4) is also applied to a coil weighing unit (1) so that the reaction force of the magnetic field influencing the melt is measured. In a weighing system (5), the net weight of melt is calculated by subtracting the signal of the coil weighing unit (1) from that of the ladle weighing unit (2). The weight change per time unit, which represents the mass flow rate of melt from the ladle, is calculated in the control system (6) and is used to control the pressure in the ladle in such a way the metal flow is kept constant.

2 Claims, 1 Drawing Sheet

METHOD OF AND APPARATUS FOR CONTROLLING THE FLOW RATE OF OUTSTREAMING LIQUID METAL FROM AN INDUCTIVELY HEATED LADLE

BACKGROUND OF THE INVENTION

1) Field of the Invention

The present invention relates to a procedure of accurately weighing the metal content in a vessel in a casting plant provided with equipment for heating/stirring the melt by inductive methods.

2) Description of Related Art

The accuracy of weighing in such applications until now has been unsatisfactory due to influence from magnetic forces arising from the induction current as well as variations of metal bath level and lining profile of the vessel, i.e., wear. These variations in turn influence the size of the magnetic forces.

DE-A1-2513923 relates to automatic controlling equipment for the preparation of metallic crystals where continuous weighing of the inductively heated vessel containing the liquid metal is performed. Compensation for the disturbance on the weighing result caused by the forces of the magnetic field has been introduced via a correction signal generator in which the influence of the disturbing force is calculated as a constant times the coil current. The correction signal generated in this way is based on a simplified theory about the origination of the disturbing force and gives no true imitation of the disturbing force during the whole casting procedure and therefore does not permit accurate enough control of the metal flow in applications where this is required. Simultaneous weighing of both vessel with metal content and heating equipment characterizing the present invention is not taught in DE-A1-2513923.

Methods of making spray-cast billets or metal powder require accurate control of the temperature of the liquid metal and of the metal flow rate. Common to all methods used is the forming of a spray of atomized metal by blowing gas jets at high speed against a liquid metal stream which disintegrates into droplets. Properties such as powder size, billet structure, grain size, porous layer thickness, etc., of gas atomized metal powder or spray-cast billets are primarily determined by the temperature and mass flow of the liquid metal during the formation of the atomized metal flow.

Methods for controlling or keeping constant the temperature or flow rate of the atomizing gas represent well-known techniques.

Controlling or keeping constant the temperature of the liquid metal during atomizing can be performed by using an inductively heated and sealed cladle. Control of the temperature of the liquid metal in such a ladle is obtained by measuring the temperature of the melt and varying the power to the induction coil. This is a known technique which has been described in SE-A-8006244-1.

The known methods and techniques for controlling the liquid metal flow through the opening of the outlet (nozzle) of an inductively heated ladle do not permit sufficient precision, however. Accurate control of the metal flow rate at the tapping of metal from a ladle is a necessity. The reason for this is that the metal has to be deposited with great precision in order to give correct and near net (final) dimension of the manufactured object. Disturbances such as clogging of the nozzle opening, affecting the deposition procedure have to be compensated for. The methods according to known technique being used so far are based upon measuring the level of the metal surface in the ladle and do not consider the lining wear of the ladle, the flow rate of the liquid inside the ladle or the wear of the nozzle opening. These methods of controlling the metal flow are based upon the theoretical relation between static pressure and flow rate derived from Bernoulli's equation. Because of factors such as temperature, viscosity of the melt, type of ceramic material, and chemical reactions between the melt and the ceramic lining, the real flow rate deviates from that which is theoretically calculated.

Another method of controlling the metal flow rate is to weigh the ladle including its metal content and calculate the total weight decrease per time-unit. The weighing equipment has to meet high demands with respect to resolution and accuracy, since the metal flow rate (weight decrease per time-unit) is so small relative to the weight of the total load and the requirement of keeping the flow constant is so great. A current requirement in the industry is that it has to be able to detect weight changes of 0.5 kg, which should be compared with the total weight of ladle and melt of about 4 metric tons of which the melt represents about 1 metric ton. The weighing operation is exposed to disturbances from the magnetic force emanating from the current in the induction coil for stirring and heating, which directly influences the weighing result. This disturbing force varies in an interval between 0 kg (at cut-off power supply) and up to about 40 kg depending upon the conditions prevailing in the process as described below.

In this prior manufacturing process, compensation was initially introduced based upon an empirical model to correct the weight signal. This model calculates the disturbing force at the actual steel bath level and coil current. Steel tubes manufactured by means of the model showed, however, that the correction factor was influenced also by the profile of the ladle lining and that the level of the steel bath could not be defined as function of the coil frequency (being used as measure of the bath level) with sufficient accuracy. The model was modified in order to consider the inner diameter of the ladle too, but was abandoned because of its complexity and the unsatisfactory results obtained.

BRIEF SUMMARY OF THE INVENTION

The present invention presents a simple and well functioning solution to the above-mentioned problems.

The present invention is based in part upon a simultaneous weighing of the vessel (ladle) with metal content and the equipment for heating/stirring.

The method and the equipment according to the present invention are also based upon direct measurement of the disturbing force and compensation for its disturbing influence on the weighing result. Since the disturbing force acting on the liquid metal, which in turn influences the ladle weighing equipment, emanates from the induction coil, the reaction force acting on the coil has to be equal but opposite in direction to the disturbing force on the melt, because no other exchange of force is taking place between the coil and its non-magnetic surroundings. By placing the induction coil on load cells and measuring the change in force caused by the variation in power supplied, the disturbing force can be measured. The signal processing to calculate true weight change in the ladle, and thus correct measure of the metal flow rate, is carried out in the measuring and control units.

DESCRIPTION OF THE PREFERRED EMBODIMENT(S)

Figure 1:
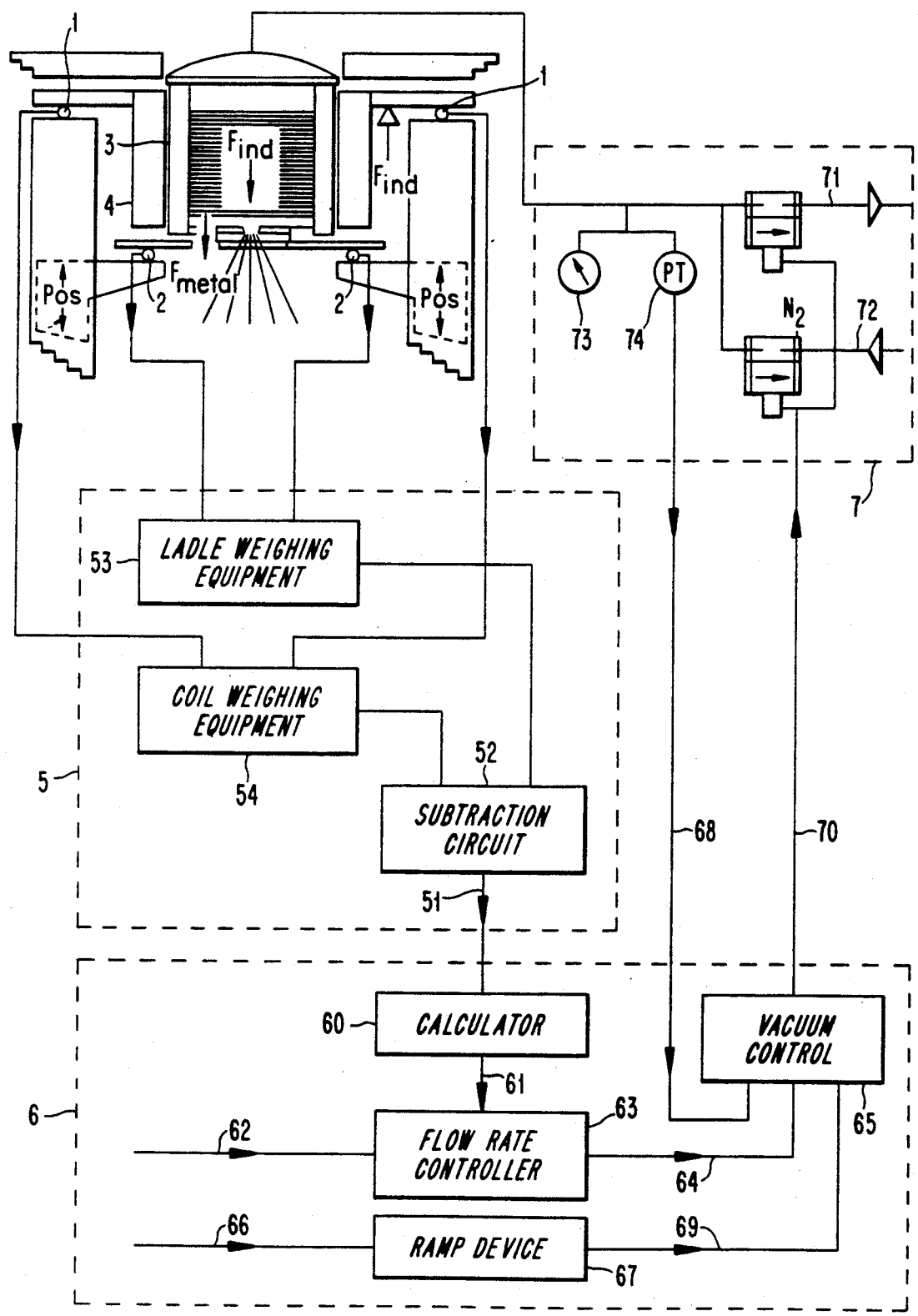
FIG. 1 depicts the apparatus for controlling the flow rate of liquid metal from an inductively heated ladle.

The present invention is described below with reference to the FIG. 1 where different reference numbers are used distinguish different parts of the equipment. The metal to be deposited is present in a ladle 3. The tapping of the metal is controlled by setting the ladle 3 under a pressure 70 below atmospheric pressure. The pressure 70 is controlled by means of a gas system 7. By changing this pressure 70, the metal column can be raised or lowered, alternatively, and in this way the metal flow rate can be controlled. The desired tapping rate is controlled by a ramp device 67 which generates a signal 69 representing pressure to be achieved as a function of time in order to obtain correct metal flow.

The ladle 3 with its metal content stands on ladle weighing equipment 2 consisting of load cells placed in positions along the circumference of the ladle 3 (preferably at three points). The ladle weighing equipment 2 is exposed to various mechanical disturbances and must be able to detect small weight changes (e.g., about 0.5 kg). In particular this means that it has to meet strong requirements on linearity (small tolerances on non-linearity). In order to remove the influence of mechanical disturbances (vibrations), the output signal of a weighing system 5 is strongly filtered. The ladle weighing equipment can be placed in different positions depending upon the vertical position of the ladle 3, which is adjustable. This is indicated by the text "Pos" in FIG. 1. By weighing the ladle 3 before the metal is poured into it, the tare weight of the ladle is measured. This is deducted from the weight of the ladle 3 with metal content by the weighing system 5 in order to obtain the net metal weight, represented by the force "$F_{metal}$" in FIG. 1.

For stirring and heating the metal in the ladle 3, the ladle 3 is supplied with a coil 4 surrounding it. From the coil 4 a force "$F_{ind}$", is induced which influences the ladle weighing equipment 2 not to detect the correct metal weight in the ladle 3, but rather a resulting weight represented by the force "$F_{metal}$"+"$F_{ind}$". The efficiency of the power supplied to the ladle 3 decreases as the amount of metal in the ladle 3 decreases. Over a long period of usage the ladle lining is worn. This wear is unequally distributed over the lining and the profile of the ladle lining therefore often takes on a pear shaped profile having the greatest wear at the slag-line. The force "$F_{ind}$" varies with the amount of power supplied and with the level of metal in the ladle 3. Furthermore, "$F_{ind}$" is influenced by the wear of the lining. In order to compensate the ladle weighing equipment 2 for the disturbance caused by the magnetic force from the coil 4 on the melt, the coil in turn has been placed on a coil weighing equipment 1 which, in a corresponding way to the ladle weighing equipment 2, has load cells placed along the circumference of the coil 4. The ladle- and the coil-weighing units 2 and 1, respectively, have separate mechanical foundations. The signal from the coil weighing equipment 1 is filtered in a way corresponding to that of the ladle weighing equipment 2 in order to remove the influence of mechanical disturbances on the weighing result. The reaction force, "$F_{ind}$", obtained from the coil weighing equipment 1 is equal but opposite in direction to the magnetic force by which the coil 4 influences the ladle weighing equipment 2. In the weighing system 5 the net weight 51 of the metal is calculated by subtraction circuit 52 of "$F_{ind}$" from "$F_{metal}$"+"$F_{ind}$". In the weighing system 5 the ladle- and the coil-weighing equipment are represented by the block diagrams 53 and 54, respectively.

In an alternative design the vessel with metal content (i.e., the ladle 3) and the power supplying device (i.e., the coil 4) can be built together into one unit to be weighed in a weighing equipment placed upon the foundation of the common unit. In this case the force exchange will take place internally in the common unit and the weighing result will not be influenced by any magnetic disturbance.

Based upon the obtained net weight 51 of metal the control system 6 calculates by calculator 60 the weight change per time unit, being the metal flow rate 61. This flow rate 61 is compared with the desired flow rate 62 in a flow rate controller 63 and the deviation 64 is used to control the pressure and the tapping out of metal. The flow-rate controller 63 also takes into account the time delay existing in the weighing system because of the filtration. In the control system 6 there is also a vacuum controller 65 which obtains information about pressure set point value 66 (via the pressure ramp device 67), measured pressure value 68 and flow rate deviation 64. The measured pressure value 68 is determined by a pressure transducer 74. A pressure gauge 73 is also provided in the gas system 7. This vacuum controller 65 in its turn acts upon the gas system 7, in which the gas pressure can be lowered via a vacuum pump 71 or raised by supply of nitrogen gas via a valve 72.

The foregoing is a detailed description of preferred embodiments of the invention. It is understood by persons of ordinary skill in the art that alternative processes, circuits and materials may be substituted for many of the processes, circuits and materials described above without departing from the scope of the present invention. The above detailed description is not limitive and the scope of the invention is to be determined by the attached claims.

I claim:

1. A method of accurately weighing a metal content of a vessel, the vessel being associated with a power supplying device for heating/stirring by inductively supplied power, the method comprising the steps of:

performing simultaneous weighing of the vessel including the metal content and the power supplying device from which emanates a magnetic disturbance force, wherein the vessel including the metal content is weighed on a first weighing equipment and the power supplying device is weighed on a second weighing equipment and a signal generated by the second weighing equipment is subtracted from a signal generated by the first weighing equipment so that the influence of the magnetic disturbance force on the weighing result is eliminated and a correct weight of the vessel is obtained.

2. An apparatus for weighing the content of a vessel inductively heated by a coil, the apparatus comprising:

vessel weighing equipment for weighing a vessel, the content of the vessel and a reaction force of the coil on the vessel weighing equipment;

coil weighing equipment for weighing the coil and the reaction force of the coil on the coil weighing equipment; and weighing circuitry for deducting the reaction force of the coil on the coil weighing equipment from the weight measurement of the vessel weighing equipment to eliminate reactive force disturbance on a determination of the net weight of the content of the vessel.

* * * * *